US008676943B1

(12) United States Patent
Parthasarathy et al.

(10) Patent No.: US 8,676,943 B1
(45) Date of Patent: Mar. 18, 2014

(54) DOCUMENT BASED FLEET MANAGEMENT (75) Inventors: Madhuvanesh Parthasarathy, Renton, WA (US); Brandon W. Porter, Auburn, WA (US)

(73) Assignee: Amazon Technologies, Inc., Reno, NV (US)

(*) Notice: Subject to any disclaimer, the term of this patent is extended or adjusted under 35 U.S.C. 154(b) by 442 days.

(21) Appl. No.: 12/894,470

(22) Filed: Sep. 30, 2010

(51) Int. Cl.
*G06F 15/16* (2006.01)

(52) U.S. Cl.
USPC .......................................................... 709/221

(58) Field of Classification Search
None
See application file for complete search history.

(56) References Cited

U.S. PATENT DOCUMENTS

2002/0178252 A1* 11/2002 Balabhadrapatruni et al. ............................ 709/223

\* cited by examiner

*Primary Examiner* — Scott Christensen
(74) *Attorney, Agent, or Firm* — Lee & Hayes, PLLC (57) ABSTRACT

Architectures and techniques are described to manage a site according to the content of a number of documents. In some cases, the number of documents may include a fleet state document that specifies aspects related to the site, such as performance metrics. Additionally, fleet creation documents may be created that indicate tasks to be executed in order to realize the aspects specified in the fleet state document. Further, task attribute maps specifying values for the attributes of each task upon execution may also be created. A workflow engine may execute the tasks of the fleet creation documents according to the values of the task attribute maps in order to configure computing devices of a fleet to realize the aspects of the fleet state document.

28 Claims, 7 Drawing Sheets

DOCUMENT BASED FLEET MANAGEMENT

BACKGROUND

Businesses often provide information to customers via a site that is accessible via a network, such as the Internet. In some cases, managing the site may include managing a number of different systems. Each of the systems may be dedicated to a different function or set of functions. For example, some site management systems may include a load balancing system, a failure handling system, a software deployment system, and so on.

Although the systems may be interdependent with changes to one system affecting the other systems, each of the systems are often managed separately. Managing the systems separately may increase the risk of misconfiguring one of the systems. For example, one or more systems may not modify their configuration to compensate for changes to the configuration of another system. In some instances, a misconfiguration of one or more of the systems may lead to a failure of the site.

In addition, the systems utilized to manage the site may be initially provisioned separately and/or put into service at different times. Inconsistencies and redundancies produced by provisioning and managing the systems separately can increase the resources utilized to manage and provision the systems managing the site. Further, provisioning and managing systems of multiple sites in an ad hoc manner may be inefficient and expensive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes architectures and techniques to manage a site according to the content of a number of documents. In some cases, the number of documents may include a fleet state document that specifies aspects related to the site. For example, the fleet state document may specify performance metrics for the site, such as an availability of the site, download time for pages of the site, etc. The fleet state document may also specify other aspects, such as a data center redundancy for the site, a number of computing devices to manage the site, an amount of data storage for the site, software executed by computing devices managing the site, latency requirements relating to requests for information from the site, implementing terms of one or more service level agreements, capacity of the site, set-up costs of the computing devices managing the site, and so on. In some instances, the fleet state document may be created by a customer of a site management service that manages the site. In other instances, the fleet state document may be created internally by a business or individual in relation to management of their own website or websites.

Based on the fleet state document, a fleet management server may determine a configuration of a plurality of computing devices to realize the aspects of the site included in the fleet state document. The computing devices utilized to realize the aspects of the fleet state document may be referred to herein as a "fleet." In an illustrative implementation, a customer of a fleet management service may provide the fleet state document to the fleet management server and the fleet management server may determine a number of tasks to be executed to realize the aspects of the fleet state document and identify a number of resources to execute the tasks. Fleet creation documents may be created to specify the number of tasks to be executed to realize the aspects of the fleet state document. The fleet management server may also determine one or more attributes associated with each of the tasks and respective values of the attributes that will realize the aspects of the fleet state document. Task attribute maps may be created specifying the tasks attributes and their respective values. A workflow engine may utilize the fleet creation documents in conjunction with the task attribute maps in order to execute tasks to realize the aspects of the fleet state document.

In this way, a customer can specify a particular performance and/or qualities of a site in the fleet state document without providing details about how the performance and/or qualities of the site will be achieved. In some cases, the process of configuring computing devices to achieve the aspects of the fleet state document is performed by the fleet management service. Thus, the involvement by the customer in managing the fleet to achieve a site with the desired performance and/or qualities is minimized. However, the fleet state document can also include specific instructions from the customer regarding management of the site, if desired.

Additionally, the fleet management server may coordinate operation of the systems utilized to manage the site to eliminate redundancies. For example, when a particular task is to be performed by a number of the systems, the fleet management server may allocate a particular set of resources to execute the task for all of the systems. Further, as the state of one or more of the systems changes, the fleet management server can modify the operation of the other systems accordingly in order to prevent misconfiguration of any of the systems. In some cases, the state of a system may be modified in response to a modification of the fleet state document.

The fleet management server may also provision and manage multiple sites. In particular, the fleet management server may receive fleet state documents for a number of sites and determine configurations of a number of fleets corresponding to each site. In some cases, the computing devices of the fleets utilized to manage the sites may overlap. For example, certain computing devices may be configured to provide load balancing for a number of sites, while another set of computing devices is configured to provide software deployment services to the number of sites. In any case, the operations of the fleet management server may be scalable to efficiently manage a number of sites.

Example Architectures

Figure 1:
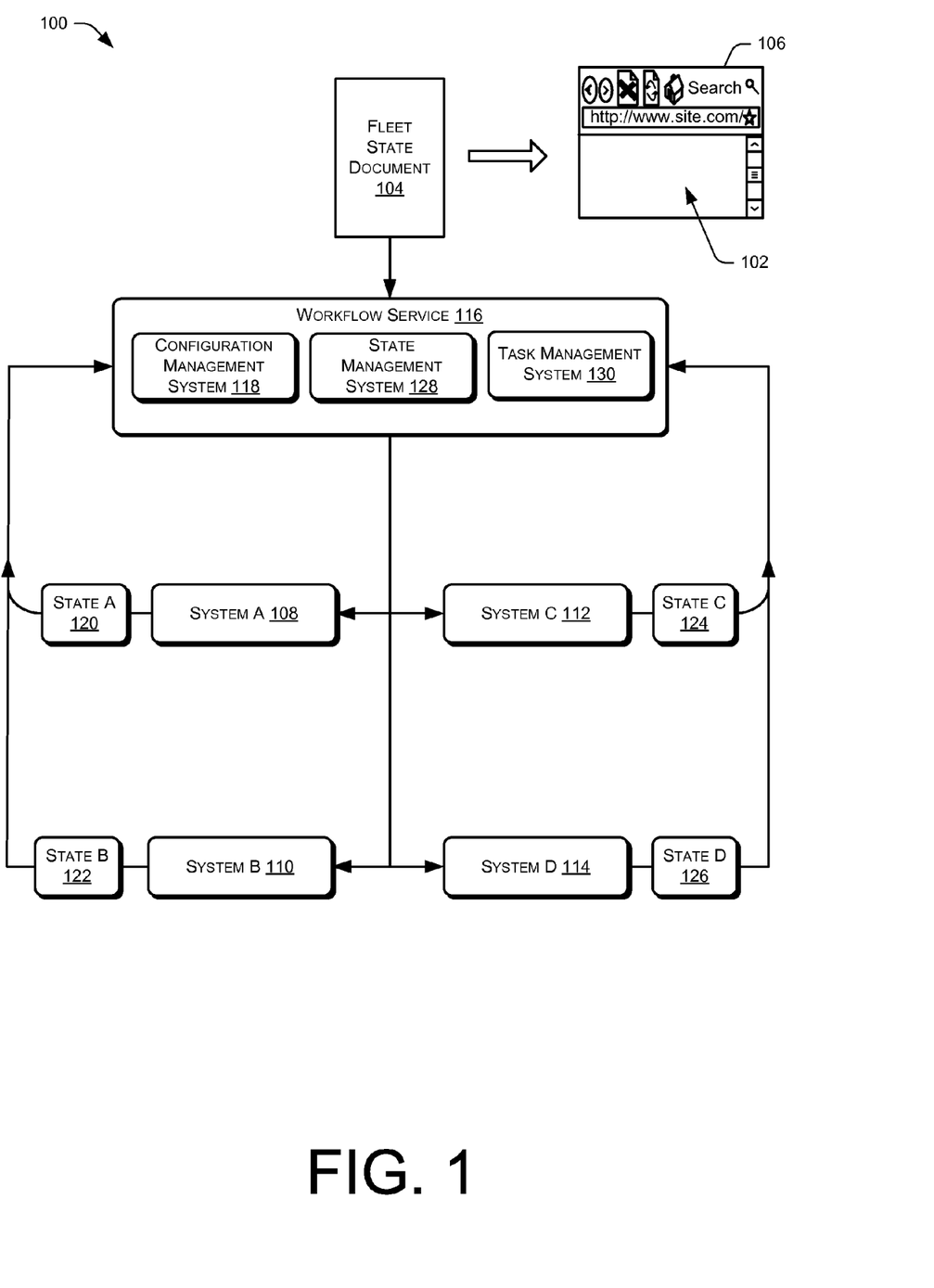
FIG. 1 illustrates an environment to produce a state of a number of systems utilized to manage a site based on a fleet state document.

FIG. 1 illustrates an environment 100 to produce a state of a number of systems utilized to manage a site 102 based on a fleet state document 104. The site 102 may be provided via a browser or other client application 106. The fleet state document 104 may include aspects related to a site 102. In some cases, the aspects may include performance metrics of the site 102 that, when realized, produce a particular state of one or more systems utilized to provide functionality related to the site 102, such as systems 108-114. The fleet state document 104 may also explicitly specify a state of the systems 108-114. Additionally, the fleet state document 104 may include particular instructions to be executed when managing the site 102, such as one or more tasks.

The architecture 100 also includes a workflow service 116 to manage the site 102. In some cases, the workflow service 116 may be utilized by a service provider to provision and manage the site 102 for a customer of the service provider. In other cases, the workflow service 116 may be an internal component of an entity, such as an online retailer, that provisions and manages the site 102 for the entity.

In the implementation shown in FIG. 1, the workflow service 116 includes a configuration management system 118 to configure the systems 108-114. In particular, the configuration management system 118 may configure computing devices implementing the systems 108-114 to produce a respective state for each of the systems 108-114, such as states 120-126. The states 120-126 may represent a configuration of a respective system 108-114, properties of a respective system 108-114, a status of one or more operations performed by a respective system 108-114, or a combination thereof.

In an illustrative implementation, the workflow service 116 receives the fleet state document 104. For example, the workflow service 116 may receive the fleet state document 104 via a HyperText Transfer Protocol (HTTP) Put request. The configuration management system 118 may then provide instructions to configure a number of computing devices implementing the systems 108-114 to produce the specified states 120-126.

Additionally, the workflow service 116 includes a state management system 128 to identify the respective states 120-126 that fulfill the requirements of the fleet state document 104. Additionally, the workflow service 116 includes a task management system 130 to determine a number of tasks to produce the specified states 120-126 and to execute the tasks.

In some instances, the task management system 130 includes a workflow engine. The workflow engine may execute tasks determined by the task management system 130 to produce the states 120-126 and consequently realize the aspects of the fleet state document 104. To illustrate, executing the tasks may involve sending instructions to computing devices implementing the systems 108-114 to configure the respective computing devices to produce the states 120-126. In addition, the workflow engine may specify the order in which the tasks are executed, merge one or more tasks, split one or more tasks, and determine dependencies between one or more tasks.

The systems 108-114 may include a load balancing system to direct the distribution of computations executed to manage the site 102 across a number of computing devices. The systems 108-114 may also include a monitoring system to identify failures with respect to the site 102 and an automated failure handling system to perform one or more remedial actions based on any identified failures. For example, the automated failure handling system may identify a host that is not functioning properly and take that host out of service. In other examples, the automated failure handling system may identify a malfunctioning disk, a malfunctioning kernel, a wrong version of a kernel, and/or a malfunctioning network card and take action to remedy the failure, such as rebooting a computing device with a malfunctioning component or producing a ticket that alerts technical support staff to address the failure.

The systems 108-114 may also include a log analysis and aggregation system, such as a real time log analysis (RTLA) system. The log analysis and aggregation system may provide one or more logs of operations of computing devices of a fleet. For example, the log analysis and aggregation system may provide metrics of fatal errors that occur with respect to the site 102. The logs provided by the log analysis and aggregation system may be used to identify problems with the site 102 and be utilized to fix the problems.

Further, the systems 108-114 may include a phased deployment system that tests software before deployment to a fleet. To illustrate, a phased deployment system may distribute a new version of software and/or a new application to a small number of computing devices of a fleet and replicate the production environment in order to test the new software and work out any bugs before deployment to the entire fleet. Additionally, the systems 108-114 may include a deployment system to deploy software to the fleet.

The systems 108-114 may also provide their respective states 120-126 to the workflow service 116. The workflow service 116 may determine whether or not the state 120-126 matches a state specified for the respective system 108-114 by the workflow service 116 based on the fleet state document 104. When a current state 120-126 does not match the state specified by the workflow service 116, the workflow service 116 may execute one or more tasks in relation to the corresponding system 108-114 to modify the current state of the system 108-114 to match the specified state.

Systems may also be added to the environment 100. For example, a billing system may be added to the number of systems 108-114. A system may be added based on aspects of the site 102 provided in the fleet state document 104. In response to the changes to the fleet state document 104, the task management system 130 may determine a number of tasks to provision and manage the new system and then execute the tasks utilizing a workflow engine. The task management system 130 may also determine additional tasks to be executed with respect to the systems 108-114 based on the addition of the new system.

Figure 2:
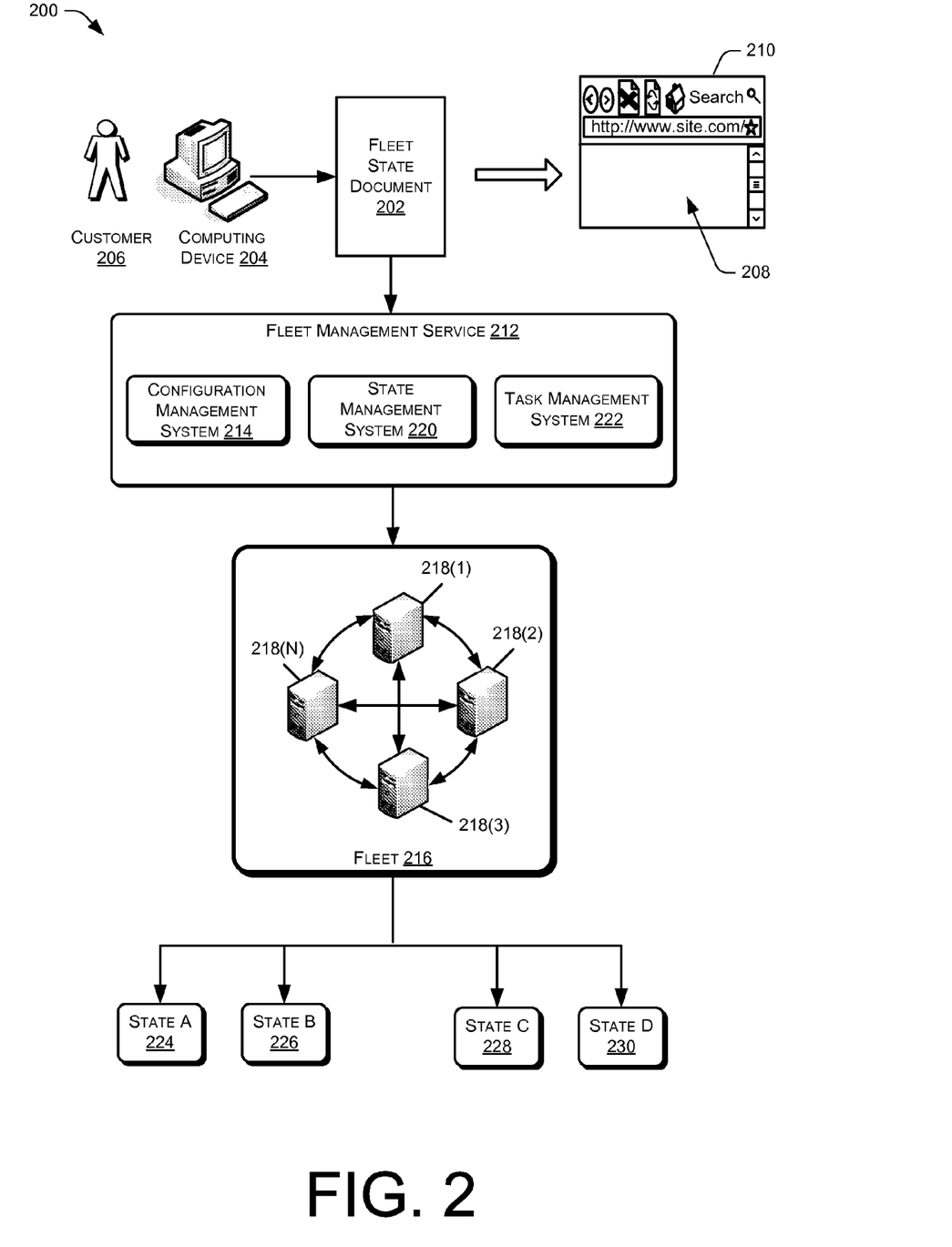
FIG. 2 illustrates an environment to produce one or more states with respect to a fleet based on a fleet state document provided by a customer to a fleet management service.

FIG. 2 illustrates an environment 200 to produce one or more states with respect to a fleet based on a fleet state document provided by a customer to a fleet management service. In particular, the environment 200 includes a fleet state document 202 that is provided by a computing device 204 of a customer 206. The fleet state document 202 may specify aspects related to a site 208. The site 208 may be provided via a browser or other client application 210. The fleet state document 202 may also specify a state of one or more systems utilized to provide the site 208. Additionally, the fleet state document 202 may include particular instructions to be executed when managing the site 208, such as one or more tasks.

The fleet state document 202 may be provided to a fleet management service 212 that manages sites for a number of customers. The fleet management service 212 may include a configuration management system 214 that provides instructions to configure a fleet 216 to produce a specified state for systems utilized to provide certain functionality for the site 208. The fleet 216 includes a number of computing devices 218(1)-218(N). The computing devices 218 may include one or more servers, one or more routers, one or more switches, one or more mainframe computers, one or more personal computers, and/or one or more other suitable computing devices, such as a Redundant Array of Independent Disks (RAID), a storage area network, wireless communication devices, telephony devices (e.g. Voice over Internet Protocol (VoIP) routers, private branch exchange (PBX) devices, etc.), electronic mail servers, configurable universal power supplies, and so on. Although FIG. 2 shows that the fleet 216 includes four computing devices 218, the fleet 216 may include any number of computing devices 218.

The fleet management service 212 also includes a state management system 220 to identify respective states of systems implemented by the fleet 216 that fulfill the requirements of the fleet state document 202. Additionally, the fleet management service 212 includes a task management system 222 to determine a number of tasks to provision and manage the fleet 216 and to execute the tasks by sending instructions to the fleet 216. The instructions may be executed by the fleet 216 to produce a number of states 224-230. The states 224-230 may represent one or more states of particular systems implemented by the fleet 216, such as the systems 108-114 of FIG. 1.

Example Server Architecture

Figure 3:
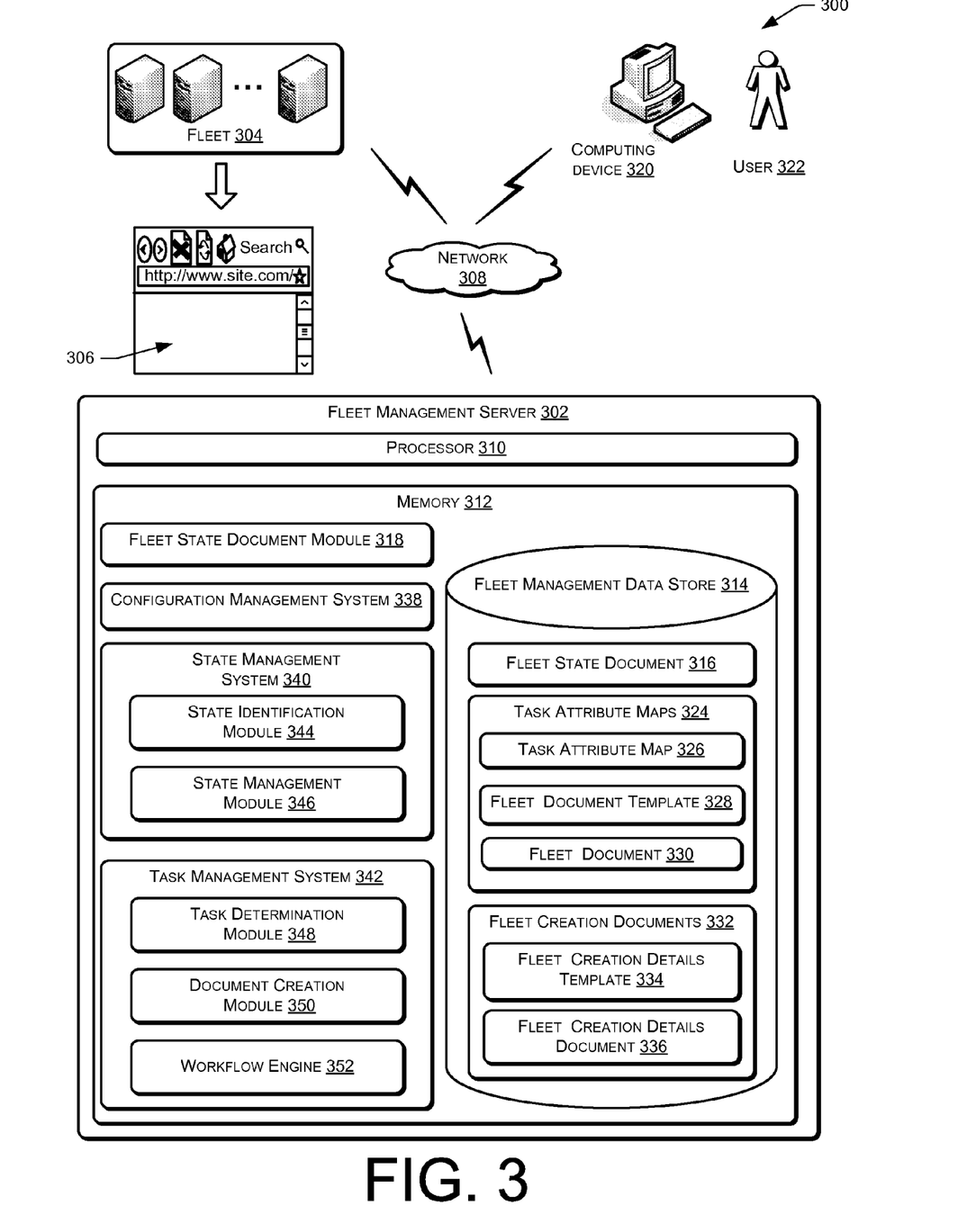
FIG. 3 shows a system that includes a fleet management server to manage a fleet that performs operations to provide a site to computing devices accessing the site.

FIG. 3 shows a system 300 that includes a fleet management server 302 to manage a fleet 304 that performs operations to manage a site 306 accessible to a number of client devices executing browser or other client applications, such as personal computers, laptop computer, smart phones, etc. In particular, the fleet 304 may implement one or more systems related to providing the site 306. For example, the fleet 304 may implement an automated failure handling system, a log analysis system, a billing system, a monitoring system, a load balancing system, a software deployment system, a software testing system, and so on.

The fleet management server 302 may comprise a single server, a cluster of servers, a server farm or data center, and so forth, although other server architectures (e.g., a mainframe architecture) may also be used. The fleet management server 302 may communicate with the fleet 304 via a network 308. The network 308 may be representative of any one or combination of multiple different types of wired and wireless networks, such as the Internet, cable networks, satellite networks, wide area wireless communication networks, wireless local area networks, and public switched telephone networks (PSTN).

In some cases, the fleet management server 302 may be part of a fleet management service or a workflow service that manages fleets for a number of sites. In other situations, the fleet management server 302 may be part of an entity that is supporting the management of the site 306. For example, the fleet management server 302 may be part of an online retailer that provides the site 306 to customers to access information regarding products and/or services offered for purchase by the online retailer.

The fleet management server 302 includes one or more processors indicated by the processor 310. The fleet management server 302 also includes memory 312 that is accessible by the processor 310. The memory 312 is an example of computer readable storage media and may include volatile memory, nonvolatile memory, removable memory, non-removable memory, or a combination thereof. For example, the memory 312 may include, but is not limited to, RAM, ROM, EEPROM, flash memory, one or more hard disks, solid state drives, optical memory (e.g. CD, DVD), or other non-transient memory technologies. The memory 312 may store a number of modules including computer-readable instructions executable by the processor 310 to manage one or more fleets.

The memory 312 includes a fleet management data store 314. The fleet management data store 314 may store one or more documents related to provisioning and maintaining fleets, such as the fleet 304. In particular, the fleet management data store 314 stores a fleet state document 316. The fleet state document 316 may specify one or more aspects related to the site 306. For example, the fleet state document 316 may specify performance metrics for the site 306, such as availability of the site 306, download time for pages of the site 306, etc. The fleet state document 316 may also specify states for one or more systems implemented by the fleet 304. To illustrate, the fleet state document 314 may indicate a particular failure handling configuration for an automated failure handling system for the site 306 that is implemented by the fleet 304. Further, the fleet state document 316 may specify one or more tasks to be performed in order to manage the site 306, such as a task to configure the fleet 304 to provide a certain amount of data storage for the site 306.

The fleet state document 316 may be stored in the fleet management data store 314 by the fleet state document module 318. The fleet state document module 318 may receive the fleet state document 316 from the computing device 320 via the network 308. In some cases, the computing device 320 may be operated by a user 322. The user 322 may represent a customer of an entity hiring a fleet management service to manage the site 306. The user 322 may also represent an employee of an entity including the fleet management server 302, where the entity is supporting management of the site 306. In any case, the user 322 may access one or more user interfaces via the computing device 320 to create the fleet state document 316. In an illustrative example, the user 322 may create the fleet state document 316 by producing a JavaScript Object Notation (JSON) record that includes metrics and/or characteristics for the site 306, such as 99.99% availability, two-data-center redundancy, a fleet size of 1000 computing devices, and so on. The user 322 may send the fleet state document 316 to the fleet management server 302 via an HTTP Put command or otherwise.

The fleet management data store 314 also stores task attribute maps 324, such as the task attribute map 326. The task attribute maps 324 associate an attribute of a task with a value. For example, a task to create a virtual IP address may be associated with attributes indicating a name of a DNS server for the virtual IP address, a type of virtual IP address, a maximum number of connections to the virtual IP address, and a port for the virtual IP address. The task attribute maps 324 may specify values associated with each of the attributes of the create virtual IP address task, such as frontend or backend for the virtual IP address type and US-PCI-1080 for the name of the DNS server. In some cases, the task attribute values may be JAVA objects that represent the values of the attributes.

The task attribute maps 324 may also include a fleet document template 328. In particular, the fleet document template 328 is a task attribute map associated with a particular type of fleet. The type of the fleet 304 may be associated with certain task attributes and certain task attribute values that are specified in the fleet document template 328. For example, the fleet 304 may be associated with a particular site application platform utilized to build the site 306 and the type of the fleet 304 may be the particular site application platform. In this example, the fleet document template 328 may include task attributes related to the particular site application platform, such as memory threshold, host type, and process count, along with the respective values for these task attributes based on the particular site application platform.

Each type of fleet serviced by the fleet management server 302 may be associated with a respective fleet document template, such as the fleet document template 328. The respective fleet document templates may include some task attributes common to the other fleet document templates. In some cases, the respective fleet document templates may also include different task attributes. Further, although some of the respective fleet document templates include the same task attributes, the values of the task attributes may be different.

Additionally, the task attribute maps 324 may include one or more fleet documents, such as the fleet document 330. The fleet document 330 is a task attribute map associated with a particular fleet, such as the fleet 304. The fleet document 330 may indicate certain task attributes and their corresponding values for the fleet 304. In addition, the fleet document 330 may reference one or more additional task attribute maps. For example, the fleet document 330 may reference a fleet document template, such as the fleet document template 328. Further, the fleet document 330 may reference an additional task attribute map, such as a task attribute map relating to virtual IP address creation task attributes and values.

By creating fleet document templates and fleet documents, the fleet management server 302 may efficiently provision and manage a fleet. For example, by creating a fleet document template for a particular type of fleet and enabling fleet documents to reference the fleet document template, task attributes and their respective values can be incorporated into the fleet document without having to perform an operation adding each of these task attributes and their respective values to each fleet document, which saves time and resources. Thus, the task attribute and task attribute value information for a particular type of fleet can be efficiently re-used without having to duplicate efforts. This also ensures consistency in characteristics between fleets of a certain type.

The fleet management data store 314 also stores fleet creation documents 332 that may be utilized to provision and/or manage the fleet 304. The fleet creation documents 332 include a fleet creation details template 334. The fleet creation details template 334 may include a number of tasks executed to manage and provision the site 304. In addition, the fleet creation details template 334 is associated with a particular type of fleet. Thus, certain tasks may be associated with different types of fleets. In some scenarios, the fleet creation details template 334 may reference other fleet creation details templates. In this way, the tasks associated with each of the referenced fleet creation details templates are incorporated into the fleet creation details template 334.

The fleet creation documents 332 also include a fleet creation details document 336. The fleet creation details document 336 is a fleet creation details template in that it specifies tasks to be executed to manage and provision a site, such as the site 304. In addition, to specifying certain tasks to be executed to provision and manage the fleet 306, the task creation details document 336 may also reference one or more additional fleet creation details templates. Thus, a task list for the fleet creation details document 336 may include tasks included in the fleet creation details document 336, as well as, tasks specified by the fleet creation details templates that are referenced by the fleet creation details document 336.

Further, the fleet creation details document 336 is associated with a particular fleet, such as the fleet 304 and includes task metadata that indicates the progress of the tasks. For example, the fleet creation details document 332 may reference a URL to a task execution state resource. The execution state of a particular task may be succeeded, failed, in progress, or queued.

In a particular implementation, the tasks of the fleet creation details template 334 and the fleet creation details document 336 are associated with particular rules that relate to the execution of these tasks. For example, the rules may indicate dependencies between tasks, such that one task is not executed until another task is completed. In some situations, the tasks may have the rules embedded in them, such as via annotations. In other situations, the rules may be included in a separate rules file, such as a Drools file.

The memory 312 also stores a configuration management system 338 to manage the respective configurations of the computing devices of the fleet 304 in order to manage the site 306. The configuration management system 338 may be executable by the processor to manage the fleet management data store 314. For example, the configuration management system 338 may persist different versions of the documents 324-336 of the fleet management data store 314 as the tasks, attributes, values, and so on of the documents 324-336 change in order to manage the site 306 according to aspects of the fleet state document 316. Thus, different configurations of the fleet 304 may be saved by the configuration management system 338 for posterity and/or for rollback, if necessary. The configuration management system 338 may also persist different versions of the fleet state document 316 as the aspects of the fleet state document 316 change over time. At least a portion of the configuration management system 338 may be implemented according to a Representational State Transfer (REST) architecture.

Further, the memory 312 stores a state management system 340 to manage the states of systems implemented by the fleet 304 and a task management system 342 to execute tasks to provision and manage the site 306. In particular, the state management system 340 includes a state identification module 344. The state identification module 344 is executable by the processor 310 to identify a state of a system implemented by the fleet 304. For example, the state identification module 344 may identify a state of a load balancing system, a state of a log analysis system, and so on. In some cases, the respective state of the systems of the fleet 304 may be specified in the fleet state document 316. In other cases, the state identification module 344 may identify the state of a system based on aspects provided in the fleet state document 316. To illustrate, the state identification module 344 may identify a state of a load balancing system implemented by the fleet 304 to achieve aspects in the fleet state document 316, such as a two (2) data center redundancy.

The state management system 340 also includes a state management module 346 that is executable by the processor 310 to determine a current state of the systems implemented by the fleet 304 and determine whether any action is necessary to change the state of a particular system. In particular, the state management module 346 may compare a current state of a system with a state of the system identified by the state identification module 344 based on the fleet state document 316. When the current state of the system does not match the specified state, the state management module 346 may invoke the task management system 342 to execute one or more tasks to modify the current state of the system to match the specified state.

The task management system 342 includes a task determination module 348 that is executable by the processor 310 to determine tasks that are executable to realize the aspects provided in the fleet state document 316 and realize the states of the systems implemented by the fleet 304 according to the contents of the fleet state document 316. For example, the fleet state document 316 may specify two (2) data center redundancy for the site 306 and the task determination module 348 may determine the tasks that are to be executed in order to achieve the two (2) data center redundancy. In another example, the state of an automated failure handling system may be a particular failure handling configuration and the task determination module 348 may determine tasks that are executable to realize the particular failure handling configuration.

In addition to determining the tasks that are executable to realize the aspects of the fleet state document 316, the task determination module 348 may determine certain attributes for each task and the corresponding values of the tasks in order to realize the aspects of the fleet state document 316. For example, when the task determination module 348 determines that a virtual IP address task is to be executed, the task determination module 348 may also associate the virtual IP address creation task with certain attributes, such as a type of the virtual IP address and a name of a DNS server for the virtual IP address. Further, the task determination module 348 may determine the values associated with the attributes of the virtual IP address creation task (e.g. backend for the type of virtual IP address and US-PCI-1080 for the name of the DNS server).

The task management system 342 also includes a document creation module 350 that is executable by the processor 310 to create documents, such as the documents 324-336, that can be utilized to provision and manage the fleet 304. In some situations, the document creation module 350 may also create the fleet state document 316 based on input received from the user 322. Any documents created by the document creation module 350 may be stored in the fleet management data store 314 by the configuration management system 338.

In a particular implementation, the document creation module 350 may identify the tasks produced by the task determination module 348 and create a fleet creation details document, such as the fleet creation details document 336, that includes those tasks. In some cases, the document creation module 350 may determine that at least a portion of the tasks are based on the type of the fleet 304. In these cases, the document creation module 350 may create a fleet creation details template, such as the fleet creation details template 334, that includes the tasks that are based on the type of the fleet 304. Additionally, the document creation module 350 may determine that some of the tasks are associated with an existing fleet creation details template and reference the existing fleet creation details template when creating the fleet creation details document 336.

The document creation module 350 may also create documents related to the attributes and their corresponding values that are associated with the tasks. In a particular implementation, the document creation module 350 may create task attribute maps, such as the task attribute map 326, to specify attributes of tasks and their respective values. When a task attribute map is associated with a particular type of fleet, such as all fleets providing sites via a particular site application platform, the document creation module 350 may create a fleet document template, such as the fleet document template 328, that specifies the task attributes and values for the particular type of fleet. Additionally, when a task attribute map is associated with a particular fleet, such as the fleet 304, the document creation module 350 may create a fleet document, such as the fleet document 330, that specifies the task attributes and values associated with the particular fleet. In some cases, the document creation module 350 may create a fleet document template that references one or more additional task attribute maps. The document creation module 350 may also create a fleet document that references one or more fleet document templates and/or one or more additional task attribute maps.

The task management system 342 also includes a workflow engine 352 that is executable by the processor 310 to execute tasks related to provisioning and managing the fleet 304. The workflow engine 352 may initiate a workflow session each time that a fleet is to be provisioned or updated.

In an illustrative implementation, in order to provision the fleet 304, the workflow engine 352 may parse the fleet creation details document 336, one or more fleet creation details templates, such as the fleet creation details template 334, or a combination thereof, to identify tasks to be executed to provision the fleet 304 and the respective attributes of those tasks. In addition, the workflow engine 352 may parse the fleet document 330, one or more fleet document templates, such as the fleet document template 328, one or more additional task attribute maps, such as the task attribute map 326, or a combination thereof, to identify values of the attributes of the tasks in the fleet creation details document 336 and/or the fleet creation details template 334.

After identifying the tasks to be executed to provision the fleet 304 and the values of the attributes of the tasks, the workflow engine 352 may identify a respective resource to execute each of the tasks. For example, the task execution resources may be a URL or a script running on a particular host. In order to execute each task, the workflow engine 352 may utilize an HTTP Put command to the URL of the resource or send a command to a particular computing device to invoke the corresponding script.

In some cases, the workflow engine 352 executes the tasks in the order specified in the fleet creation details document 336 and/or the fleet creation details template 334. In other cases, one or more of the tasks to be executed to provision the fleet 304 may be associated with certain rules. For example, the rules may indicate that some tasks are to be executed in a particular order. The rules may also indicate procedures for dealing with conflicts between tasks.

The workflow engine 352 may also receive a task execution state for each task. The task execution state provided to the workflow engine 352 may include a name of the task being executed, the name of the fleet for which the task is being executed, and a workflow session identifier. The state of execution for a particular task may include queued, in progress, succeeded, and/or failed.

In some implementations, the fleet state document 316 may be modified and the configuration management system 338, the state management system 340, and the task management system 343 are executable by the processor 310 to alter the fleet 304 to accommodate the changes to the fleet state document 316. For example, a new system may be implemented by the fleet 304. In particular, the user 322 may modify the fleet state document 316 or provide an additional fleet state document to add the new system to be implemented by the fleet 304. In another example, the aspects of the fleet state document 316 may be changed. To illustrate, the user 322 may designate three (3) data center redundancy rather than two (2) data center redundancy in the fleet state document.

In response to a modification of the fleet state document 316 or receiving an additional fleet state document related to the fleet 304, the state identification module 344 may determine whether a state of one of the systems implemented by the fleet 304 needs to be modified or determine a new state for a newly added system. Additionally, the task determination module 348 may determine tasks needed to implement the new state and/or the new aspects based on the changes to the fleet state document 316 or the additional fleet state document. The document creation module 350 may create new task attribute maps 324 and fleet creation documents 332 or modify the existing task attribute maps 324 and the existing fleet creation documents 332 to reflect the changes to the fleet state document 316. For example, new tasks may be added to the fleet creation details document 336 or to the fleet creation details template 334. Further, attributes associated with the newly added tasks and corresponding values of the attributes may be added to the task attribute map 326, the fleet document template 328, the fleet document 330, or a combination thereof. In some cases, merely the values of existing task attributes may be modified in response to the modification of the fleet state document 316 and new tasks and any corresponding attributes may not need to be added to the task attribute maps 324 and/or the fleet creation documents 332.

After the task attribute maps 324 and the fleet creation documents 332 have been modified according to the changes to the fleet state document 316, the workflow engine 352 may execute newly added tasks and/or execute existing tasks according to new attribute values. In some cases, when new tasks are added, the new tasks may be associated with newly added task execution resources and the workflow engine 352 may utilize an HTTP Put command or invoke a script to execute these new tasks. Additionally, an execution state for each of the newly added or newly executed tasks is returned to the workflow engine 352 from the respective task execution resource.

Example Fleet Creation Resources

Figure 4:
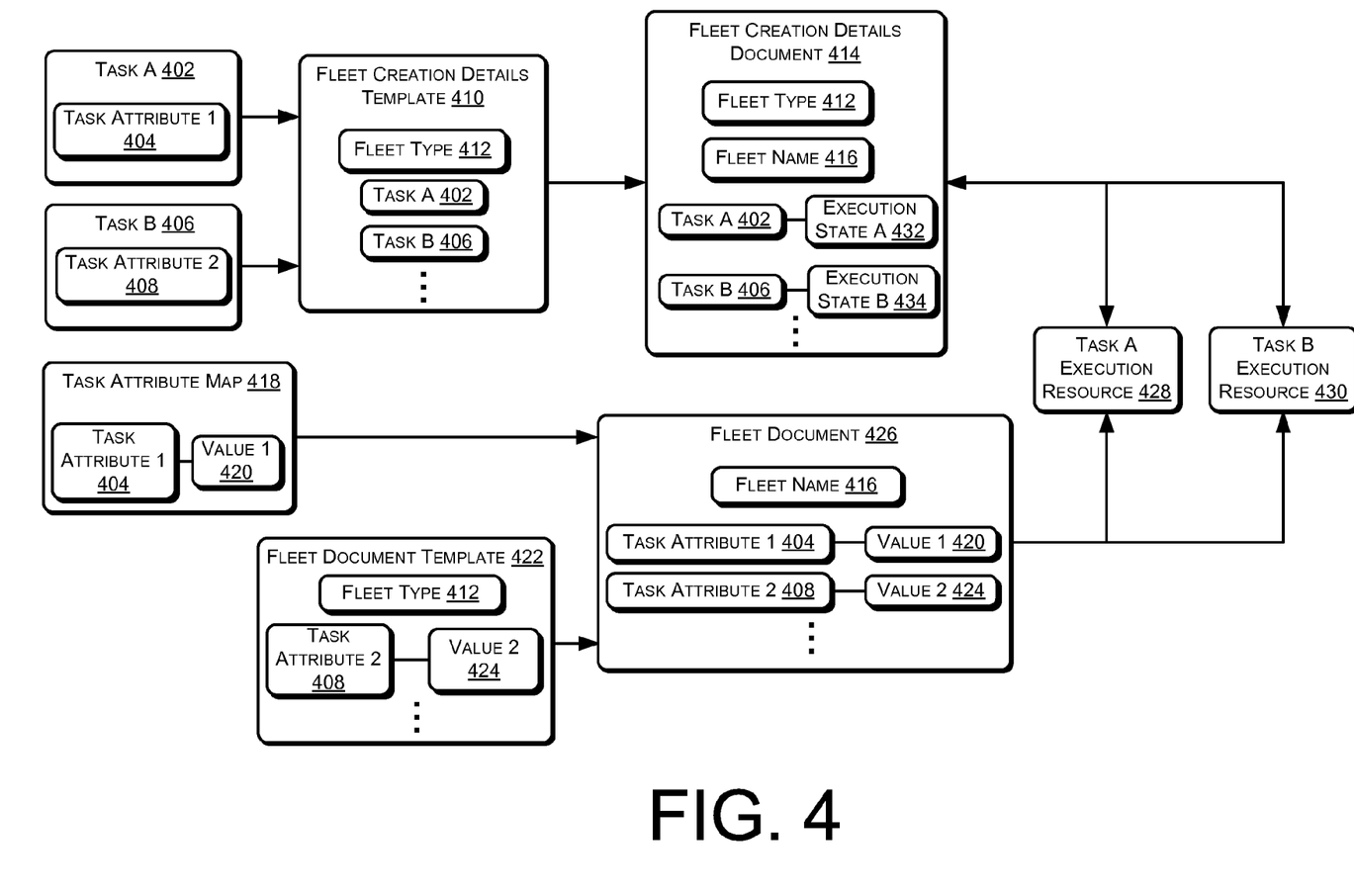
FIG. 4 shows example fleet creation resources and how the fleet creation resources may work together to execute tasks.

FIG. 4 shows example fleet creation resources and how the fleet creation resources may work together to execute a task. The fleet creation resources include a Task A 402 having an attribute 1 404 and a Task B 406 having an attribute 2 408. The Task A 402 and the Task B 406 may be tasks that are executed to provision or update a fleet that implements systems to manage a site, such as the site 102 of FIG. 1, 208 of FIG. 2, or 306 of FIG. 3. The task A 402 and the Task B 406 may be executed in order to realize one or more aspects of a fleet state document. In addition to being associated with their respective attributes 404 and 408, the Task A 402 and the Task B 406 may be associated with metadata that describe the respective task. In some instances, the metadata may indicate whether a particular task is idempotent, that is whether a Put command can be executed with respect to the particular task any number of times or whether the Put command can be executed only once and any further changes to the particular task are implemented via executing a Post operation.

The Task A 402 and the Task B 406 may be associated with a fleet creation details template 410. The fleet creation details template 410 is also associated with a fleet type 412. The fleet type 412 may correspond to a particular configuration of the fleet or a particular site application platform utilized by the fleet to provide the site.

The fleet creation details template 410 may be part of a fleet creation details document 414. The fleet creation details document 414 may be associated with the fleet type 412 and also with a fleet name 416. The fleet name 416 may designate a particular site that is provided by the fleet. The fleet creation details document 414 may also include each of the tasks to be executed in order for the fleet to implement the systems utilized to manage the site. The fleet creation details document 414 may include tasks other than those from the fleet creation details template 410. In particular, certain tasks may be passed into the fleet creation details document 414 from a task management system and/or from other fleet creation details templates.

The values for the attributes, Attribute 1 404 and Attribute 2 408 of Task A 402 and Task B 406, respectively, may be stored in task attribute maps that associate each task attribute with a value. The value of the task attribute may be based on a particular metric or other aspect of a fleet state document. As shown in FIG. 4, a task attribute map 418 includes the task attribute 1 404 and its respective value, value 1 420. Additionally, a fleet document template 422 includes the task attribute 2 408 and its respective value, value 2 424. The fleet document template 422 is associated with the fleet type 412. The task attributes and their values from the task attribute map 418 and the fleet document template 422 may be incorporated into the fleet document 426. The fleet document 426 is associated with the fleet name 416.

Each of the tasks, Task A 402 and Task B 406, is associated with a particular task execution resource. For example, the Task A 402 is associated with a task execution resource 428 and the Task B 406 is associated with a task execution resource 430. The task execution resources 428 and 430 may be URLs and/or scripts running on a host.

In order to execute tasks, a workflow engine, such as the workflow engine 352 of FIG. 3, may parse the fleet creation details document 414 to determine tasks that are to be executed, such as the Task A 402 and the Task B 406. The workflow engine may also determine the values of the attributes of the tasks by parsing the fleet document 426. For example, the workflow engine may determine that the task attribute 1 404 of the Task A is associated with the value 1 420 and that the task attribute 2 408 of the Task B 406 is associated with the value 2 424. The workflow engine may utilize an HTTP Put command to send the tasks to be executed and the values of their respective attributes to the corresponding task execution resources. Thus, the workflow engine may provide the value 1 420 of the Task A 402 to the task A execution resource 428 and the value 2 424 of the Task B 404 to the task B task execution resource 430. After executing the Task A 402 and the Task B 406, the task execution resources 428, 430 may return an execution state A 432 associated with the Task A 402 and an execution state B 434 associated with the Task B 406 to the workflow engine. The workflow engine may then store the execution states 432, 434 in association with the fleet creation details document 414.

Illustrative Processes

Figure 5:
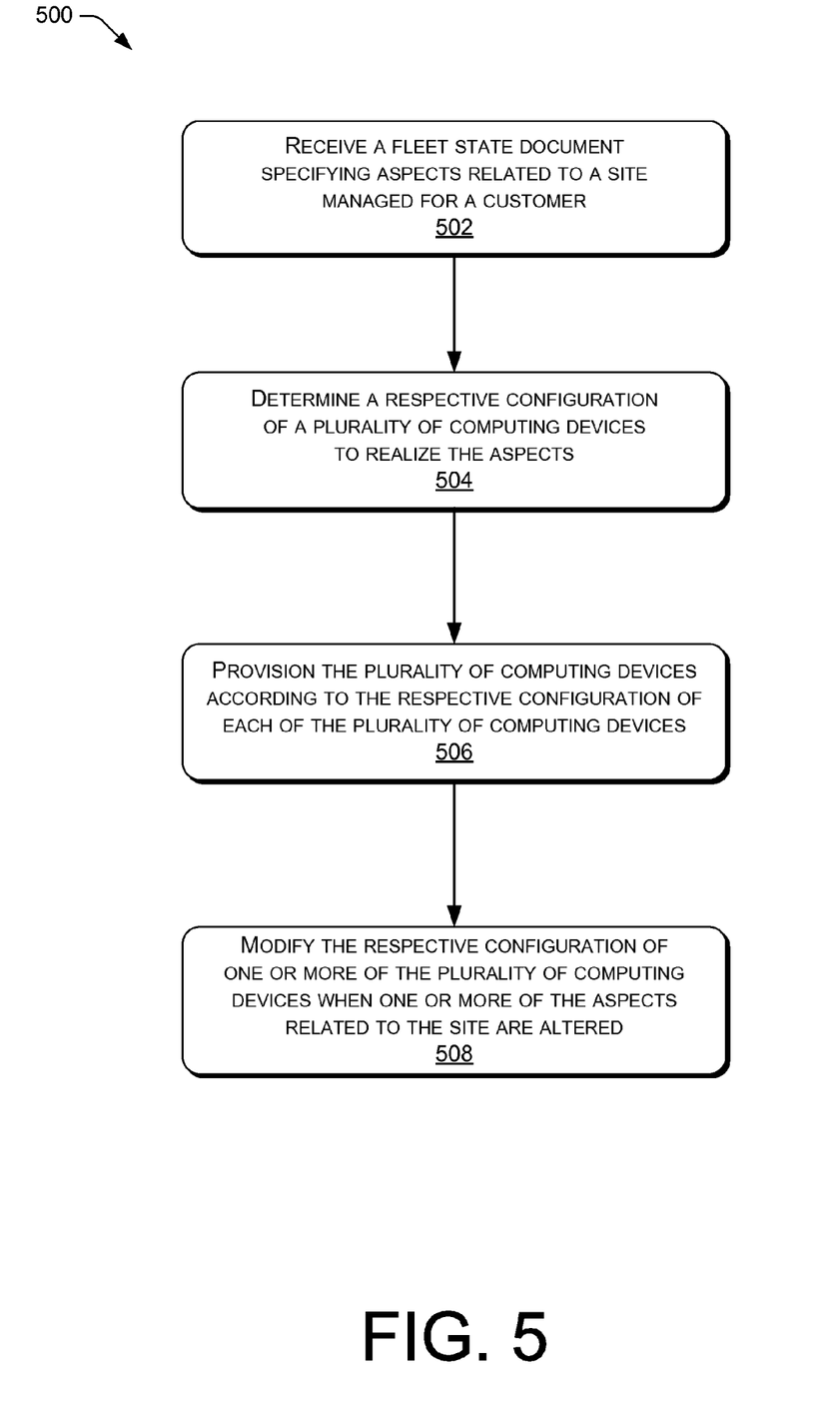
FIG. 5 is a flow diagram of a process to provision a plurality of computing devices according to aspects of a fleet state document.
Figure 6:
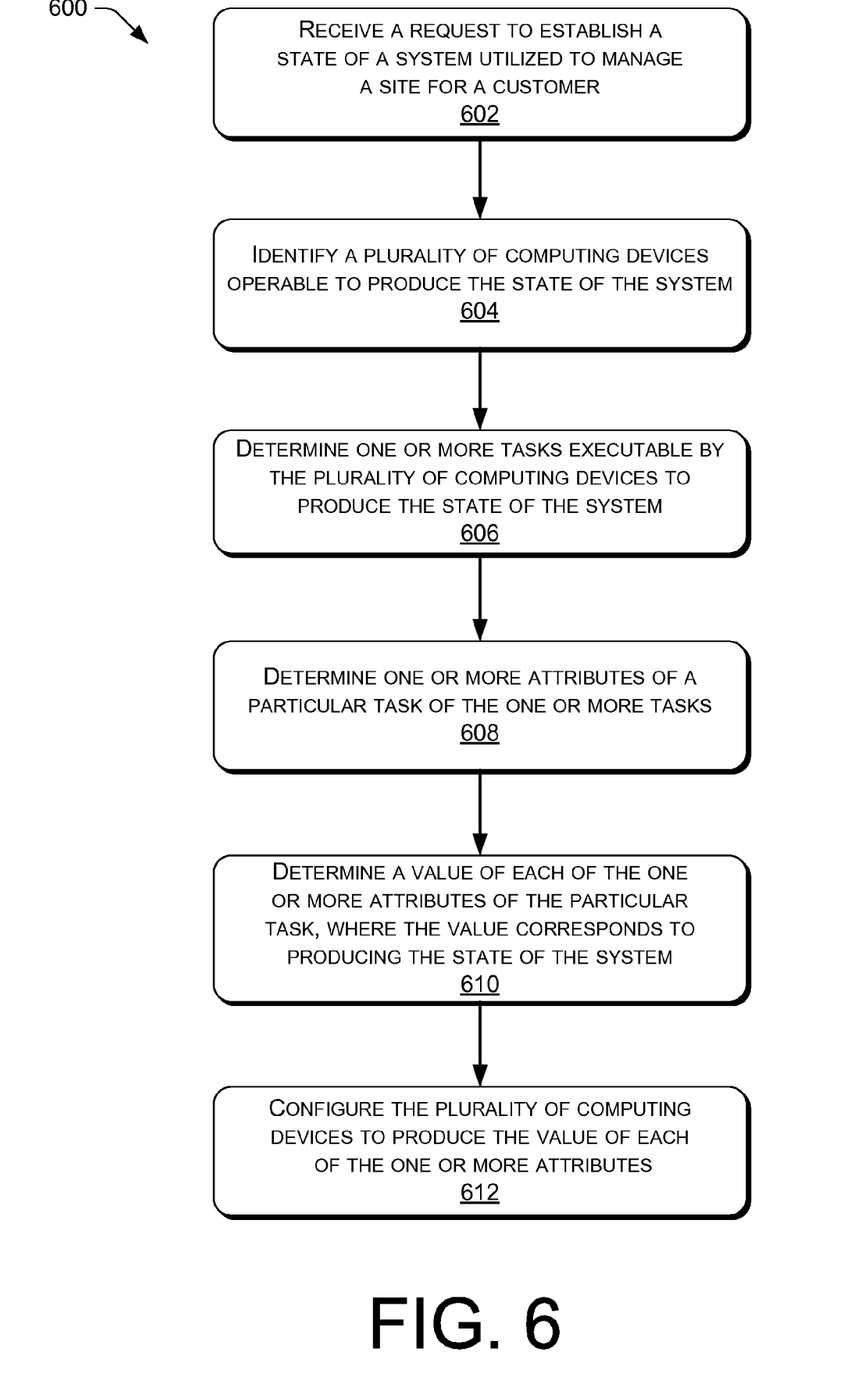
FIG. 6 is a flow diagram of a process to configure a plurality of computing devices to produce a respective value of attributes of each of a plurality of tasks that are to be executed to provision a fleet.
Figure 7:
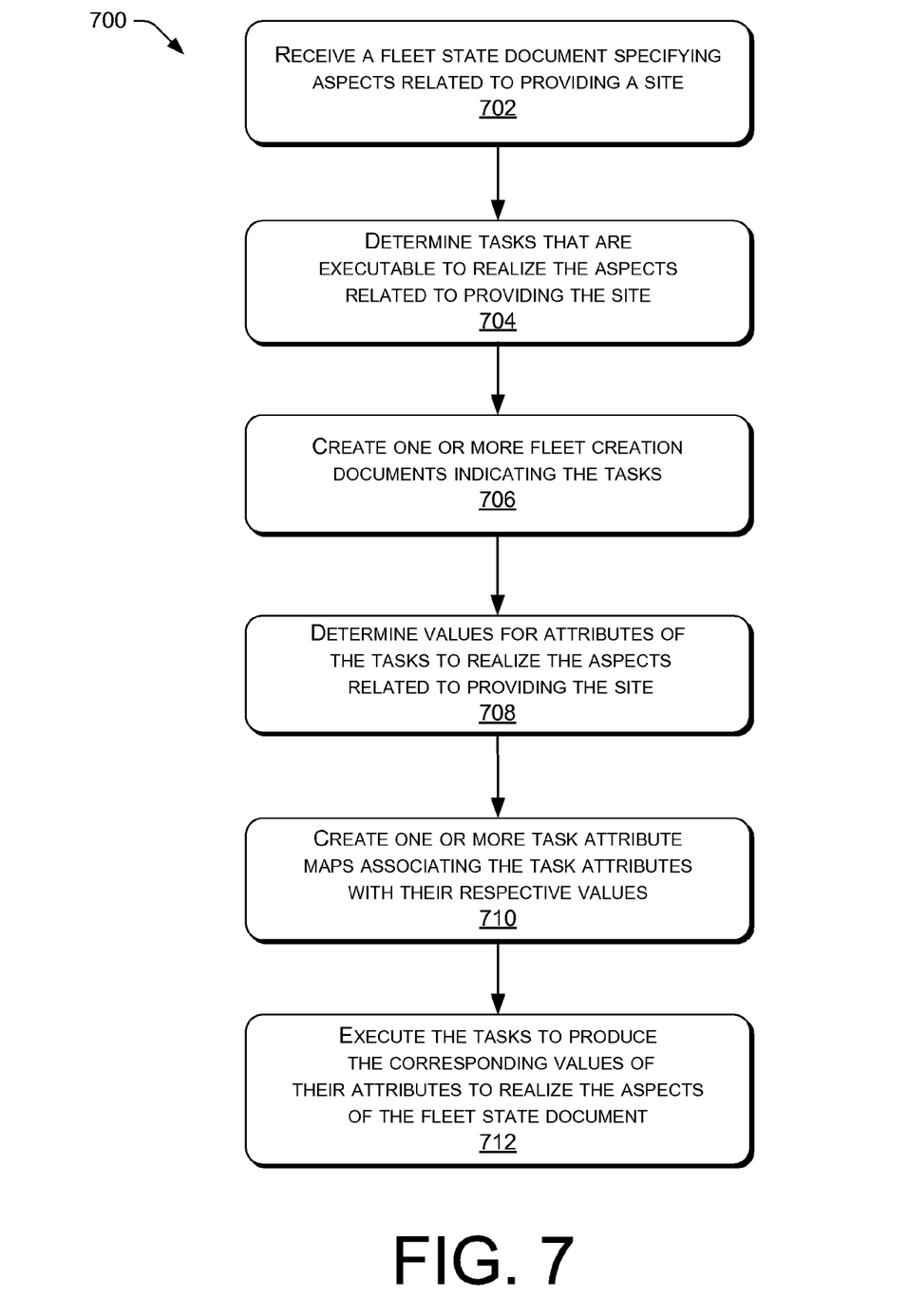
FIG. 7 is a flow diagram of a process to create documents that include tasks and values for attributes of the tasks that produce aspects of a site as specified in a fleet state document.

FIGS. 5-7 show processes 500-700 respectively, to manage sites based on the content of certain documents. The processes 500-700 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 5 is a flow diagram of a process 500 to provision a plurality of computing devices according to aspects of a fleet state document. At 502, a fleet state document is received by a fleet management service. The fleet state document specifies aspects that are related to a site managed on behalf of a customer by the fleet management service. The aspects may include performance metrics, such as availability of the site and download time for pages of the site. The aspects may also include other metrics associated with the site, such as an amount of memory storage dedicated to the site.

At 504, the fleet management service determines a respective configuration of a plurality of computing devices to realize the aspects of the fleet state document. The plurality of computing devices may be a fleet that implements systems managing the site for the customer. The configuration of each computing device of the fleet may relate to software executed by a particular computing device, certain tasks executed by the particular computing device, and so on, that are needed to realize the aspects specified in the fleet state document.

At 506, each of the plurality of computing devices is provisioned according to the respective configuration of each of the plurality of computing devices. For example, certain software may be deployed to specified computing devices. Additionally, storage space and/or processing resources of the computing devices may be provisioned according to the respective configurations.

At 508, the respective configuration of one or more of the plurality of computing devices is modified when one or more aspects related to the site are altered. For example, the customer may change some of the aspects of the fleet state document, such as increasing the amount of storage space dedicated to the site. In another example, the customer may modify the fleet state document to indicate adding a new system to the fleet, such as a billing system or load balancing system. In any case, the configuration of at least a portion of the computing devices of the fleet is modified in order to realize the modified aspects of the fleet state document.

FIG. 6 is a flow diagram of a process 600 to configure a plurality of computing devices to produce a respective value of each task that is to be executed to provision a fleet. At 602, a request is received by a fleet management server to establish a state of a system utilized to manage a site for a customer of a fleet management service. For example, the request may be a fleet state document including aspects related to the site that include a state of the system. To illustrate, the fleet state document may include a particular failure handling configuration for an automated failure handling system. In another example, the request may be produced based on aspects of the fleet state document.

At 604, a plurality of computing devices operable to produce the state of the system are identified. For example, a particular fleet or a particular portion of the fleet dedicated to implementing the system is identified. At 606, one or more tasks executable by the plurality of computing devices to produce the state of the system are determined.

At 608, one or more attributes of a particular task are determined. The attributes may be determined based on a resource associated with the task that includes each of the attributes of the task. At 610, a value of each of the one or more attributes of the particular task is determined. The attributes may correspond to producing the state of the system specified in the request. In other words, when the task is executed to produce the respective value of each of the attributes or a portion of the attributes, then the state of the system is realized or at least partially realized. In a particular example, when the task is executed to produce the value in conjunction with a number of other tasks being executed to produce their respective values, then the state of the system is realized. At 612, the plurality of computing devices are configured to produce the value of each of the one or more attributes of the particular task.

FIG. 7 is a flow diagram of a process 700 to create documents that include tasks and values for attributes of the tasks that, when executed, realize aspects for a site as specified in a fleet state document. At 702, a fleet state document is received at a fleet management server specifying aspects related to providing a site. In some cases, the site may be provided by a fleet management service for a customer. In other cases, the site may be provided using internal resources of a particular entity. For example, the site may be provided by a workflow service of an online retailer for its customers.

At 704, tasks are determined that are executable to realize the aspects related to providing the site. At 706, one or more fleet creation documents indicating the tasks may be automatically created. For example, a fleet creation details document, such as the fleet creation details document 336 of FIGS. 3 and 414 of FIG. 4, may be created that includes a list of the tasks to be executed to realize the aspects of the fleet state document.

At 708, values for attributes of the tasks needed to realize the aspects related to providing the site are determined. At 710, one or more task attribute maps associating the task attributes with their respective values may be automatically created. In some cases, the task attribute map may be a fleet document template when the task attribute map is associated with a particular type of fleet. In this way, certain task attributes are associated with certain values for particular types of fleets, such as computing devices configured with a particular site application framework. In other cases, when the task attribute map is associated with a particular fleet, such as a group of computing devices managing a particular site, the task attribute map may be a fleet document.

At 712, the tasks are executed to produce the corresponding values of their respective attributes to realize the aspects of the fleet state document. To illustrate, a workflow engine may access the fleet creation documents to determine the tasks to be executed to realize the aspects of the fleet state document and also access the task attribute maps to identify the values of the attributes of the tasks to be achieved upon execution. Thus, by executing the tasks of the fleet creation documents to produce the task attribute values of the task attribute maps, the computing devices of a fleet can be configured to operate in a manner that realizes the aspects of the fleet state document.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computer-implemented method, comprising:
    under control of one or more computing systems configured with specific executable instructions,
    receiving a fleet state document specifying aspects related to managing a site for a customer;
    storing the fleet state document in a data store;
    producing a request based, at least in part, on the aspects specified in the fleet state document, the request indicating a specified state of a system utilized to manage the site for the customer, wherein the system is one of a plurality of systems utilized to manage the site;
    identifying a plurality of computing devices that are operable to produce the specified state of the system;
    determining one or more tasks executable by the plurality of computing devices to produce the specified state of the system;

determining one or more attributes of a particular task of the one or more tasks;

determining a respective value of individual ones of the one or more attributes of the particular task, wherein the specified state of the system is produced when at least a portion of the one or more attributes are associated with the corresponding respective value;

configuring the plurality of computing devices to produce the respective value of the individual ones of the one or more attributes;

comparing a current state of the system with the specified state of the system;

determining that the current state of the system does not match the specified state; and executing one or more additional tasks to modify the current state of the system to match the specified state.

2. The computer-implemented method of claim 1, wherein at least a portion of the one or more tasks are executable to produce a state of an additional system utilized to manage the site.

3. The computer-implemented method of claim 1, wherein the one or more attributes of the particular task are included in a task attribute map that specifies respective values of particular attributes of at least a portion of the one or more tasks.

4. The computer-implemented method of claim 1, wherein each of the one or more tasks is executed by a task execution resource.

5. The computer-implemented method of claim 4, wherein the task execution resource is a script running on one of the plurality of computing devices.

6. The computer-implemented method of claim 4, wherein the task execution resource is a uniform resource locator (URL).

7. The computer-implemented method of claim 1, wherein at least a portion of the one or more tasks executable by the plurality of computing devices to produce the specified state of the system are specified in a fleet creation document, the fleet creation document indicating a plurality of tasks to configure the plurality of computing devices.

8. The computer-implemented method of claim 7, wherein the fleet creation document is related to a particular site application platform.

9. The computer-implemented method of claim 1, wherein each of the one or more tasks is associated with a respective execution state.

10. The computer-implemented method of claim 9, wherein the respective execution state of each of the one or more tasks includes succeeded, failed, in progress, queued, or a combination thereof.

11. A non-transitory computer-readable storage media storing computer-readable instructions that, when executed, instruct a processor to perform operations comprising:

receiving a fleet state document at a fleet management server, the fleet state document specifying a plurality of aspects related to a site managed for a customer;

storing, in a data store, a first version of the fleet state document including the aspects related to the site;

determining a respective configuration of a plurality of computing devices to realize the aspects of the first version of the fleet state document;

provisioning the plurality of computing devices according to the respective configuration of individual ones of the plurality of computing devices;

receiving input from a user of a computing device indicating changes to an aspect of the plurality of aspects of the site included in the first version of the fleet state document;

producing a second version of the fleet state document based, at least in part, on the input received from the user by modifying the aspect of the plurality of aspects of the first version of the fleet state document;

storing, in the data store, a second version of the fleet state document including the changes to the aspect of the site; and modifying the respective configuration of one or more of the plurality of computing devices to realize the changes to the aspect of the plurality of aspects of the site.

12. The non-transitory computer-readable storage media of claim 11, wherein the aspects include performance metrics of the site.

13. The non-transitory computer-readable storage media of claim 11, wherein a first computing device of the plurality of computing devices has a different configuration from a second computing device of the plurality of computing devices.

14. The non-transitory computer-readable storage media of claim 11, wherein the operations further comprise maintaining the configuration of the plurality of computing devices until the one or more aspects of the site are altered.

15. The non-transitory computer-readable storage media of claim 11, wherein the plurality of computing devices include one or more servers, one or more routers, one or more switches, one or more mainframe computers, one or more personal computers, one or more additional computing devices, or a combination thereof.

16. A computing system comprising:

a processor; and memory accessible by the processor, the memory storing:

a fleet state document specifying aspects related to managing a site;

a fleet document template including a plurality of task attributes, individual ones of the task attributes of the plurality of task attributes being associated with a respective value, and the fleet document template being associated with a type of fleet; and a fleet creation details template including one or more tasks to be executed to manage the site, the fleet creation details template being associated with the type of fleet, and individual ones of the one or more tasks being associated with a respective task attribute of the plurality of task attributes;

a task determination module executable by the processor to:

determine a plurality of tasks to realize the first aspects related to managing the site included in the fleet state document based, at least in part, on the one or more tasks included in the fleet creation details template; and determine, for a task of the plurality of tasks, a task attribute and a corresponding value for the task attribute based, at least in part, on the fleet document template; and a workflow engine executable by the processor to execute individual ones of the plurality of tasks.

17. The computing system of claim 16, further comprising a document creation module that is executable by the processor to:

create a fleet creation details document specifying the plurality of tasks to realize the aspects related to managing the site; and create task attribute map indicating the plurality of task attributes and the respective value of individual ones of the plurality of task attributes.

18. The computing system of claim 17, wherein the workflow engine is executable by the processor to parse the fleet creation details document to identify a task to be executed by the workflow engine.

19. The computing system of claim 18, wherein the workflow engine is executable by the processor to parse the task attribute map to identify the first respective value of a task attribute of the task.

20. The computing system of claim 16, wherein at least a portion of the plurality of tasks is specified by a customer of a fleet management service that manages the site for the customer.

21. A computing system to manage a site, the computing system comprising:
a processor; and
memory accessible by the processor, the memory storing:
a state management system executable by the processor to:
identify a respective state of individual ones of systems of a plurality of systems based on aspects specified in a fleet state document related to the site, wherein the plurality of systems are utilized to manage the site;
compare a current state of a particular system of the plurality of systems with the respective state of the particular system; and
determine that the current state of the particular system does not match the respective state of the particular system; and
a task management system executable by the processor to:
determine a plurality of tasks that are executable to realize the aspects specified in the fleet state document;
execute the plurality of tasks;
determine one or more additional tasks that are executable to modify the current state of the particular system to match the respective state of the particular system; and
execute the one or more additional tasks.

22. The computing system of claim 21, wherein the fleet state document is modified to indicate that an additional system is added to the plurality of systems.

23. The computing system of claim 21, wherein the plurality of systems are utilized to manage an additional site.

24. The computing system of claim 23, wherein the memory stores an additional fleet state document specifying aspects for the additional site.

25. The computing system of claim 21, wherein a task of the plurality of tasks is to be performed by a first system of the plurality of systems and a second system of the plurality of systems.

26. The computing system of claim 25, further comprising a workflow engine executable by the processor to:
identify a task execution resource to execute the task; and
execute the task for the first system and the second.

27. The computing system of claim 22, wherein the task management system is executable by the processor to:
determine a number of tasks to provision and manage the additional system; and
determine additional tasks to be executed by the particular system based, at least in part, on adding the additional system.

28. The computing system of claim 21, wherein the aspects specified by the fleet state document include download time for pages of the site, availability of the site, data center redundancy for the site, or a combination thereof.

* * * * *